(12) United States Patent
Chun et al.

(10) Patent No.: US 11,636,979 B2
(45) Date of Patent: Apr. 25, 2023

(54) DIELECTRIC COMPOSITION AND MULTILAYER ELECTRONIC COMPONENT INCLUDING THE SAME

(71) Applicant: SAMSUNG ELECTRO-MECHANICS CO., LTD., Suwon-si (KR)

(72) Inventors: Hee Sun Chun, Suwon-si (KR); Hong Gi Nam, Suwon-si (KR); Je Hee Lee, Suwon-si (KR); Ji Su Hong, Suwon-si (KR); Seung In Baik, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/391,321

(22) Filed: Aug. 2, 2021

(65) Prior Publication Data
US 2022/0181080 A1    Jun. 9, 2022

(30) Foreign Application Priority Data
Dec. 9, 2020  (KR) .................. 10-2020-0171392

(51) Int. Cl.
*H01G 4/008* (2006.01)
*H01G 4/12* (2006.01)
*H01G 4/30* (2006.01)
*H01G 4/012* (2006.01)

(52) U.S. Cl.
CPC ........... *H01G 4/1227* (2013.01); *H01G 4/008* (2013.01); *H01G 4/012* (2013.01); *H01G 4/30* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

| 5,731,950 A * | 3/1998 | Sakamoto ............ H01G 4/1227 361/321.4 |
| 9,928,960 B2 * | 3/2018 | Nakanishi ........... C04B 35/4682 |
| 2013/0083450 A1 * | 4/2013 | Yoon .................... H01G 4/1227 361/321.4 |
| 2016/0155570 A1 | 6/2016 | Shimada et al. |
| 2020/0251242 A1 * | 8/2020 | Kwon ................. C04B 35/4682 |
| 2022/0139623 A1 * | 5/2022 | Park ........................ H01G 4/232 361/301.4 |

FOREIGN PATENT DOCUMENTS

| JP | 2017119610 A * | 7/2017 | ............... H01B 3/08 |
| KR | 10-2016-0065012 A | 6/2016 | |
| KR | 10-2020-0096019 A | 8/2020 | |

\* cited by examiner

*Primary Examiner* — Nathan Milakovich
(74) *Attorney, Agent, or Firm* — Morgan, Lewis & Bockius LLP (57) ABSTRACT

A dielectric composition includes: a $BaTiO_3$-based main component and a first accessory component, wherein the first accessory component includes dysprosium (Dy) and terbium (Tb), the sum (Dy+Tb) of contents of dysprosium (Dy) and terbium (Tb) is more than 1.5 mol and 2.0 mol or less based on 100 mol of Ti of the main component, and $0.1 \leq Tb/Dy < 0.15$ in which Tb/Dy is a ratio of the content of terbium (Tb) to the content of dysprosium (Dy).

20 Claims, 3 Drawing Sheets

DIELECTRIC COMPOSITION AND MULTILAYER ELECTRONIC COMPONENT INCLUDING THE SAME

CROSS-REFERENCE TO RELATED APPLICATION(S)

This application claims benefit of priority to Korean Patent Application No. 10-2020-0171392 filed on Dec. 9, 2020 in the Korean Intellectual Property Office, the disclosure of which is incorporated herein by reference in its entirety.

BACKGROUND

1. Field

The present disclosure relates to a dielectric composition and a multilayer electronic component including the same.

2. Description of Related Art

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In order to achieve the miniaturization and the capacitance increase of the multilayer ceramic capacitor, the numbers of stacked dielectric layers and internal electrodes need to be increased by decreasing thicknesses of the dielectric layers and the internal electrodes. Currently, the thickness of the dielectric layer has reached a level of about 0.6 µm, and a thickness decrease of the dielectric layer has been conducted.

However, as the thickness of the dielectric layer is decreased, reliability is decreased, and characteristics such as insulation resistance and a breakdown voltage are decreased.

In order to solve such a problem, a method capable of securing high reliability, particularly in terms of a composition of the dielectric, as well as in terms of a structure of the multilayer ceramic capacitor, has been required.

When a dielectric composition capable of further raising a level of reliability from a current level is secured, a multilayer ceramic capacitor having a smaller thickness may be manufactured.

SUMMARY

An aspect of the present disclosure may provide a dielectric composition having excellent reliability, and a multilayer electronic component including the same.

Another aspect of the present disclosure may provide a dielectric composition having excellent insulation resistance, and a multilayer electronic component including the same.

Another aspect of the present disclosure may provide a dielectric composition satisfying X5R temperature characteristics, and a multilayer electronic component including the same.

According to an aspect of the present disclosure, a dielectric composition may include: a $BaTiO_3$-based main component and a first accessory component, wherein the first accessory component includes dysprosium (Dy) and terbium (Tb), a sum (Dy+Tb) of contents of dysprosium (Dy) and terbium (Tb) is more than 1.5 mol and 2.0 mol or less based on 100 mol of Ti of the main component, and $0.1 \leq Tb/Dy < 0.15$ in which Tb/Dy is a ratio of the content of terbium (Tb) to the content of dysprosium (Dy).

According to another aspect of the present disclosure, a multilayer electronic component may include: a body including dielectric layers and internal electrodes disposed alternately with the dielectric layers; and external electrodes disposed on the body, wherein the dielectric layer includes a dielectric composition, and the dielectric composition includes a $BaTiO_3$-based main component and a first accessory component, the first accessory component includes dysprosium (Dy) and terbium (Tb), the sum (Dy+Tb) of contents of dysprosium (Dy) and terbium (Tb) is more than 1.5 mol and 2.0 mol or less based on 100 mol of Ti of the main component, and $0.1 \leq Tb/Dy < 0.15$ in which Tb/Dy is a ratio of the content of terbium (Tb) to the content of dysprosium (Dy).

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may refer to a stacked direction or a thickness T direction, a second direction may refer to a length L direction, and a third direction may refer to a width W direction.

Dielectric Composition

A dielectric composition according to an exemplary embodiment in the present disclosure may include: a $BaTiO_3$-based main component and a first accessory component, wherein the first accessory component includes dysprosium (Dy) and terbium (Tb), the sum (Dy+Tb) of contents of dysprosium (Dy) and terbium (Tb) is more than 1.5 mol and 2.0 mol or less based on 100 mol of Ti of the main component, and $0.1 \leq Tb/Dy < 0.15$ in which Tb/Dy is a ratio of the content of terbium (Tb) to the content of dysprosium (Dy). The sum of (Dy+Tb) may be more than 1.4 mol, more than 1.5 mol, more than 1.6 mol, more than 1.7 mol, more than 1.8 mol, or more than 1.9 mol based on 100 mol of Ti of the main component. The sum of (Dy+Tb) may be 1.9 mol or less, 1.8 mol or less, 1.7 mol or less, or 1.6 mol or less. The contents of Dy and Tb may be 0.11≤Tb/Dy<0.14 or 0.12≤Tb/Dy<0.13.

In general, many rare earth elements may be added in order to secure reliability of a dielectric in a multilayer ceramic capacitor.

Among these rare earth elements, dysprosium (Dy) has been known to be effective in improving reliability by reducing a concentration of oxygen vacancies while substituting for a Ba-site when added to barium titanate ($BaTiO_3$), which is a main component.

Meanwhile, when a rare earth element having an ionic radius larger than that of dysprosium (Dy), such as lanthanum (La) or samarium (Sm) is used, such a rare earth element may more effectively substitute for the Ba-site and may thus be more effective in reducing a concentration of oxygen vacancy defects, but was not actually used due to a problem that insulation resistance is rapidly decreased due to excessive enhancement of semiconductor characteristics of the dielectric.

Therefore, it was thought that it would be preferable to use a rare earth element of which an ionic radius is larger than that of dysprosium (Dy) and a size difference from dysprosium (Dy) is not large in order to suppress the enhancement of the semiconductor characteristics of the dielectric to secure the insulation resistance while significantly reducing the concentration of oxygen vacancy defects to improve the reliability.

In addition, since a fixed-valance of general rare earth elements is +3, when the general rare earth element substitutes for Ba (+2), $BaTiO_3$ in which the general rare earth element substitutes for Ba (+2) has a single positive charge ($D'_{Ba}$), but when a rare earth element such as terbium (Tb) that may have a multi-valance of +4 substitutes for Ba (+2), $BaTiO_3$ in which the rare earth element such as terbium (Tb) substitutes for Ba (+2) may have a double positive charge ($D''_{Ba}$), and an effect of reducing the concentration of oxygen vacancy defects may thus be two.

To the contrary, a rare earth element such as ytterbium (Yb) that has a multi-valence of +2 is not effective in reducing the concentration of oxygen vacancy defects because $BaTiO_3$ in which the rare earth element such as ytterbium (Yb) substitutes for Ba (+2) is neutral in terms of charge at the time of substituting for Ba (+2). For this reason, it is known that reliability is further decreased when ytterbium (Yb) is added.

As a result, a terbium (Tb) element that has an ionic radius larger than that of dysprosium (Dy), but does not enhance the semiconductor characteristics of the dielectric enough to reduce the insulation resistance and has a multi-valence was the most effective in reducing the concentration of oxygen vacancy defects, such that it was expected that the terbium (Tb) element may significantly improve reliability of a dielectric in a multilayer ceramic capacitor. Therefore, a dielectric composition in which dysprosium (Dy) and terbium (Tb) are simultaneously used has been developed.

In the related art, there was an attempt to add one or more of dysprosium (Dy), gadolinium (Gd), and terbium (Tb) as rare earth elements to a dielectric composition.

However, even in this case, terbium (Tb) was simply listed as a rare earth element or was added in a small amount without recognizing the effect of terbium (Tb) described above, and there is no specific research into a content of terbium (Tb) added in order to improve the reliability.

In an exemplary embodiment in the present disclosure, a ratio having an excellent effect in improving the reliability might be found by searching for an optimal ratio in contents of added dysprosium (Dy) and terbium (Tb).

According to an exemplary embodiment in the present disclosure, the sum (Dy+Tb) of the contents of dysprosium (Dy) and terbium (Tb) may be adjusted to be more than 1.5 mol and 2.0 mol or less based on 100 mol of Ti of the main component, such that reliability such as insulation resistance may be improved and a change in capacitance according to a change in a temperature may be suppressed to satisfy X5R temperature characteristics.

When the sum (Dy+Tb) of the contents of dysprosium (Dy) and terbium (Tb) is 1.5 mol or less or more than 2.0 mol, insulation resistance may be decreased, and insulation resistance particularly at a high temperature may be decreased.

In addition, the ratio (Tb/Dy) of the content of terbium (Tb) to the content of dysprosium (Dy) may be adjusted to satisfy the formula 0.1≤Tb/Dy<0.15, such that reliability such as insulation resistance may be improved and a change in capacitance according to a change in a temperature may be suppressed to satisfy X5R temperature characteristics.

When the ratio (Tb/Dy) of the content of terbium (Tb) to the content of dysprosium (Dy) is less than 0.1, a reliability improving effect due to the addition of terbium (Tb) may be insufficient.

On the other hand, when the ratio (Tb/Dy) of the content of terbium (Tb) to the content of dysprosium (Dy) is 0.15 or more, insulation resistance may be decreased due to excessive enhancement of semiconductor characteristics of the dielectric.

When the sum (Dy+Tb) of the contents of dysprosium (Dy) and terbium (Tb) and the ratio (Tb/Dy) of the content of terbium (Tb) to the content of dysprosium (Dy) are simultaneously adjusted to be within the ranges described above according to an exemplary embodiment in the present disclosure, reliability such as insulation resistance may be improved and a change in capacitance according to a change in a temperature may be suppressed to satisfy X5R temperature characteristics.

Respective components of the dielectric composition according to an exemplary embodiment in the present disclosure will hereinafter be described in more detail.

a) Main Component

The dielectric composition according to an exemplary embodiment in the present disclosure may include a main component represented by $BiTiO_3$.

According to an exemplary embodiment in the present disclosure, the main component may include one or more selected from the group consisting of $BaTiO_3$, $(Ba_{1-x}Ca_x)(Ti_{1-y}Ca_y)O_3$ (here, 0≤x≤0.3 and 0≤y≤0.1), $(Ba_{1-x}Ca_x)(Ti_{1-y}Zr_y)O_3$ (here, 0≤x≤0.3 and 0≤y≤0.5), and $Ba(Ti_{1-y}Zr_y)O_3$ (here, 0<y≤0.5), but is not limited thereto.

The dielectric composition according to an exemplary embodiment in the present disclosure may have a dielectric constant of 2000 or more at room temperature.

The main component is not particularly limited, and an average particle size of main component powders may be 40 nm or more to 150 nm or less.

b) First Accessory Component

According to an exemplary embodiment in the present disclosure, the dielectric composition may include dysprosium (Dy) and terbium (Tb) as first accessory component elements, and the sum (Dy+Tb) of the contents of dysprosium (Dy) and terbium (Tb) and the ratio (Tb/Dy) of the molar content of terbium (Tb) to the molar content of dysprosium (Dy) may be adjusted, such that reliability such as insulation resistance may be improved and a change in capacitance according to a change in a temperature may be suppressed to satisfy X5R temperature characteristics.

The sum (Dy+Tb) of the contents of dysprosium (Dy) and terbium (Tb) may be adjusted to be more than 1.5 mol and 2.0 mol or less based on 100 mol of Ti of the main component, such that reliability such as insulation resistance may be improved and a change in capacitance according to a change in a temperature may be suppressed to satisfy X5R temperature characteristics.

When the sum (Dy+Tb) of the contents of dysprosium (Dy) and terbium (Tb) is 1.5 mol or less or more than 2.0 mol, insulation resistance of the multilayer electronic component may be decreased, and insulation resistance particularly at a high temperature may be decreased.

In addition, the ratio (Tb/Dy) of the molar content of terbium (Tb) to the molar content of dysprosium (Dy) may be adjusted so that $0.1 \leq Tb/Dy < 0.15$, such that reliability such as insulation resistance may be improved and a change in capacitance according to a change in a temperature may be suppressed to satisfy X5R temperature characteristics.

When the ratio (Tb/Dy) of the content of terbium (Tb) to the content of dysprosium (Dy) is less than 0.1, a reliability improving effect of the multilayer electronic component due to the addition of terbium (Tb) may be insufficient.

On the other hand, when the ratio (Tb/Dy) of the content of terbium (Tb) to the content of dysprosium (Dy) is 0.15 or more, insulation resistance may be decreased due to excessive enhancement of semiconductor characteristics of the dielectric.

In an exemplary embodiment, the content of terbium (Tb) may be more than 0.16 mol and less than 0.235 mol based on 100 mol of Ti of the main component. The content of Tb may be more than 0.17 mol, more than 0.18 mol, more than 0.19 mol, more than 0.20 mol, more than 0.21 mol, or more than 0.22 mol. The content of Tb may be less than 0.22 mol, less than 0.21 mol, less than 0.20 mol, less than 0.19 mol, less than 0.18 mol, or less than 0.17 mol.

When the content of terbium (Tb) is 0.16 mol or less based on 100 mol of Ti, a reliability improving effect due to the addition of terbium (Tb) may be insufficient.

On the other hand, when the content of terbium (Tb) is 0.235 mol or more based on 100 mol of Ti, insulation resistance may be decreased due to excessive enhancement of semiconductor characteristics of the dielectric.

In an exemplary embodiment, the first accessory component may further include one or more of Y, Ho, Er, Ce, Nd, Pm, Eu, Tb, Tm, Yb, Lu, or Sm, which are rare earth elements, in addition to Dy and Tb. The content of the first accessory component may be . . . .

b) Second Accessory Component

According to an exemplary embodiment in the present disclosure, the dielectric composition may include Mg as a second accessory component in a content of 0.5 mol or less based on 100 mol of Ti of the main component.

Mg may act as an acceptor to serve to reduce an electron concentration. When Mg is added in a content of 0.5 mol or less based on 100 mol of Ti of the main component, a reliability improving effect due to enhancement of n-type characteristics may be significantly increased.

When Mg is added in a content more than 0.5 mol based on to 100 mol of Ti of the main component, a dielectric constant may be decreased.

In an exemplary embodiment, the second accessory component may further include one or more of Al, Cr, Fe, Ni, Co, Cu, Zr, or Hf, and a content of the second accessory component may be 1.5 mol or less based on 100 mol of Ti of the main component.

Al, Cr, Fe, Ni, Co, Cu, Zr, and Hf may also be elements acting as acceptors like Mg. That is, the sum of contents of acceptor elements including Mg may be controlled to be 1.5 mol or less. When the sum of the contents of the acceptor elements is more than 1.5 mol, oxygen vacancy defects may be increased.

In an exemplary embodiment, a ratio of the sum of the contents of the second accessory components to the sum of the contents of the first accessory components may be more than 1.4 and less than 2.0 in a molar ratio. That is, (the sum of the contents of the acceptor elements/the sum of the contents of the rare earth elements) may be more than 1.4 and less than 2.0 in a molar ratio.

As the ratio of the sum of the contents of the second accessory components to the sum of the contents of the first accessory components is more than 1.4 and less than 2.0 in a molar ratio, additives may be actively solid-dissolved to optimize a reliability improving effect.

c) Third Accessory Component

According to an exemplary embodiment in the present disclosure, the dielectric composition may include Mn and V as third accessory components, and the sum of contents of Mn and V may be 0.3 mol or less based on 100 mol of Ti of the main component.

Mn and V may be elements having a multi-valence, and may serve to decrease a sintering temperature of the multilayer ceramic capacitor in which the dielectric composition is used and improve high-temperature breakdown voltage characteristics.

In an exemplary embodiment, the content of Mn satisfies the formula Mn 0.2V in a molar ratio. Therefore, the high-temperature breakdown voltage characteristics may be more effectively improved, such that a reliability improving effect may be obtained. When Mn<0.2V, insulation resistance may be decreased due to excessive enhancement of donor characteristics of V.

Multilayer Electronic Component

Figure 1:
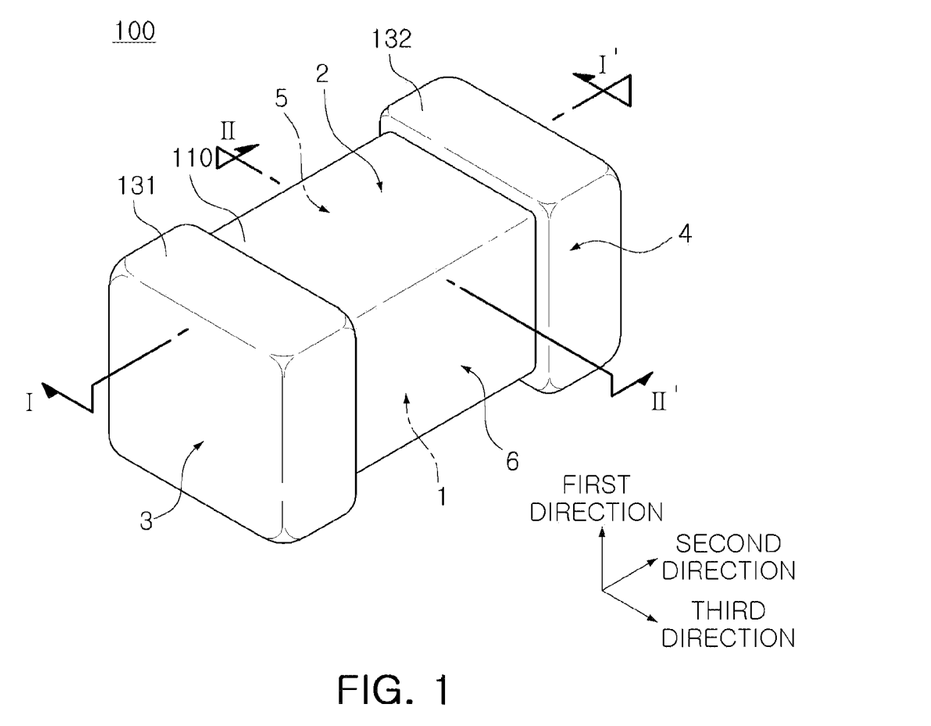
FIG. 1 is a schematic perspective view illustrating a multilayer electronic component according to an exemplary embodiment in the present disclosure.

FIG. 1 is a schematic perspective view illustrating a multilayer electronic component according to an exemplary embodiment in the present disclosure.

Figure 2:
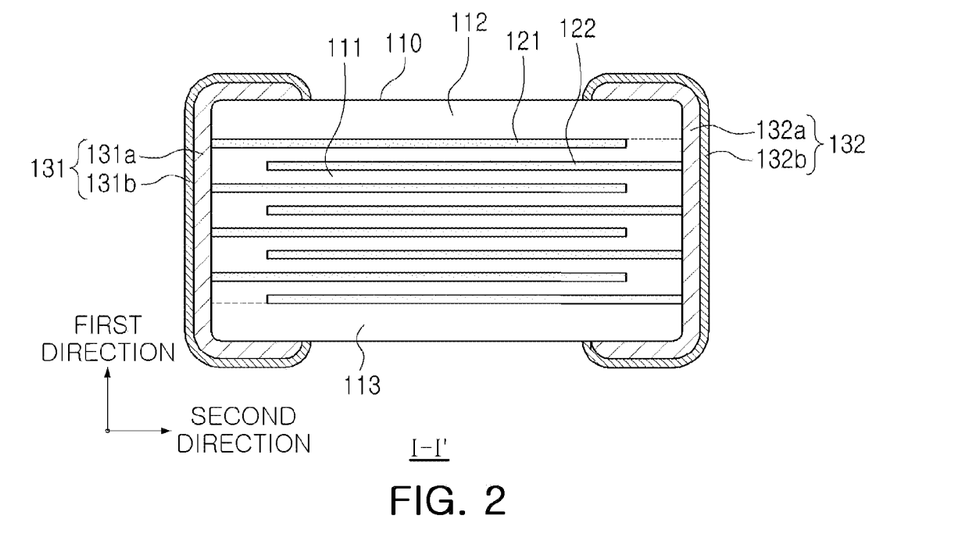
FIG. 2 is a schematic cross-sectional view taken along line I-I' of FIG. 1.

FIG. 2 is a schematic cross-sectional view taken along line I-I' of FIG. 1.

Figure 3:
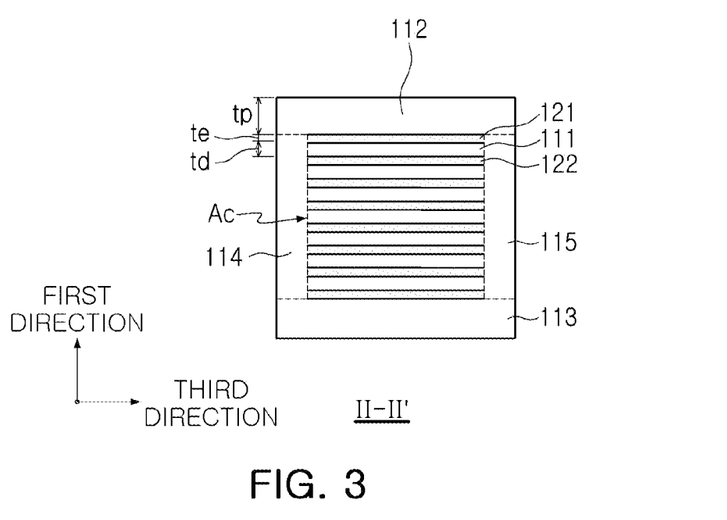
FIG. 3 is a schematic cross-sectional view taken along line II-II' of FIG. 1.

FIG. 3 is a schematic cross-sectional view taken along line II-II' of FIG. 1.

Figure 4:
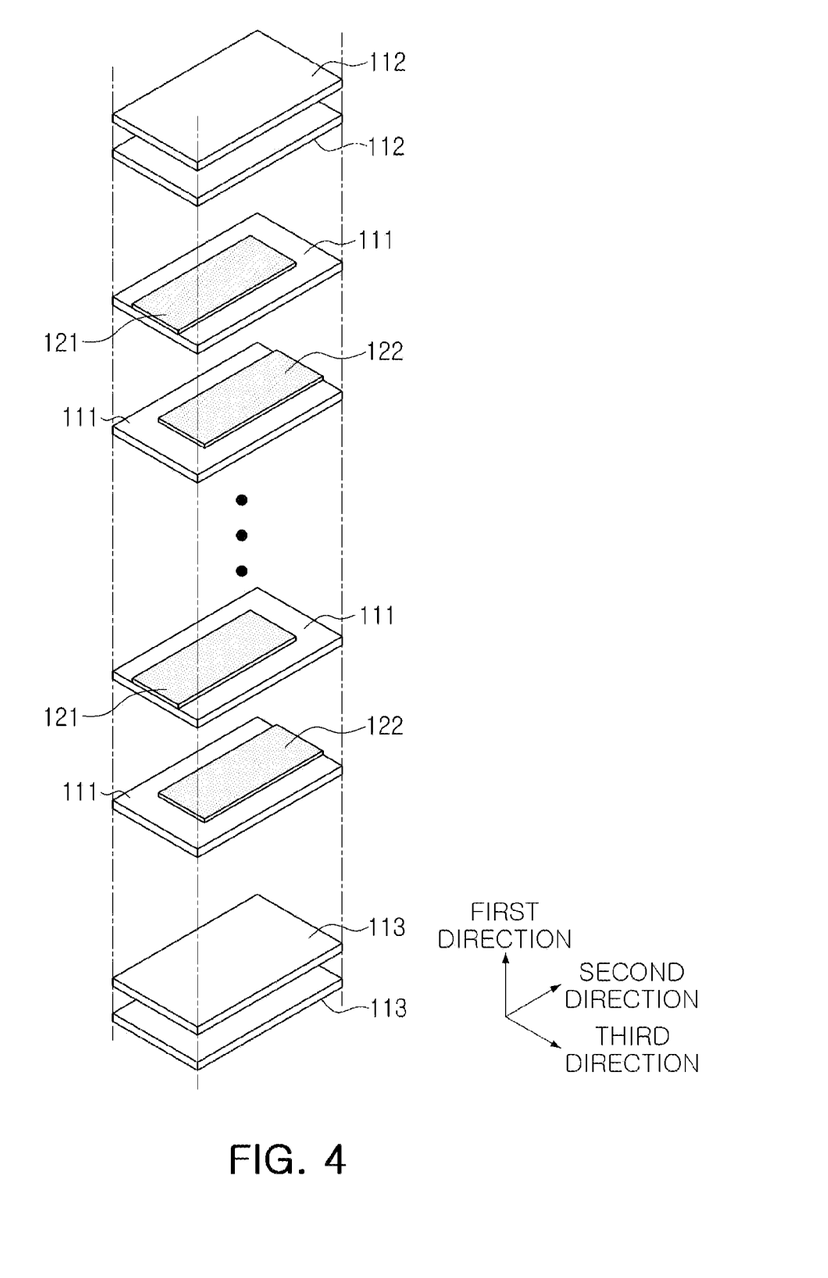
FIG. 4 is a schematic exploded perspective view illustrating a body of the multilayer electronic component according to an exemplary embodiment in the present disclosure.

FIG. 4 is a schematic exploded perspective view illustrating a body of the multilayer electronic component according to an exemplary embodiment in the present disclosure.

A multilayer electronic component according to an exemplary embodiment in the present disclosure will hereinafter be described in detail with reference to FIGS. 1 through 4. However, a description for portions overlapping the description of the dielectric composition described above will be omitted to avoid an overlapping description. In addition, a multilayer ceramic capacitor will be described as an example of the multilayer electronic component, but the present disclosure may also be applied to various electronic components that use the dielectric component described above, such as an inductor, a piezoelectric element, a varistor, or a thermistor.

A multilayer electronic component 100 according to an exemplary embodiment in the present disclosure may include: a body 110 including dielectric layers 111 and internal electrodes 121 and 122 disposed alternately with the dielectric layers; and external electrodes 131 and 132 disposed on the body, wherein the dielectric layer includes a dielectric composition, and the dielectric composition includes a $BaTiO_3$-based main component and a first accessory component, the first accessory component includes dysprosium (Dy) and terbium (Tb), the sum (Dy+Tb) of contents of dysprosium (Dy) and terbium (Tb) is more than 1.5 mol and 2.0 mol or less based on 100 mol of Ti of the main component, and 0.1≤Tb/Dy<0.15 in which Tb/Dy is a ratio of the content of terbium (Tb) to the content of dysprosium (Dy).

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

The dielectric layer 111 may be formed using the dielectric composition described above.

Components of a dielectric used for the multilayer electronic component may be analyzed by, for example, the following method. In a case of a destructive method, the multilayer electronic component may be crushed, the internal electrodes may be removed, the dielectric may be selected, and components of the dielectric selected as described above may be analyzed using a device such as inductively coupled plasma optical emission spectroscopy (ICP-OES) or inductively coupled plasma mass spectrometry (ICP-MS). In addition, in a case of a non-destructive method, components of the dielectric may be analyzed at a central portion of the multilayer electronic component using a transmission electron microscopy-energy disperse X-ray spectrometer (TEM-EDS).

Meanwhile, a thickness td of the dielectric layer 111 does not need to be particularly limited.

However, in general, when the dielectric layer is formed to have a small thickness less than 0.6 µm, in particular, when a thickness of the dielectric layer is 0.53 µm or less, reliability of the dielectric layer may be decreased.

As described above, according to an exemplary embodiment in the present disclosure, the reliability such as the insulation resistance may be improved by adjusting the sum (Dy+Tb) of the contents of dysprosium (Dy) and terbium (Tb) and the ratio (Tb/Dy) of the content of terbium (Tb) to the content of dysprosium (Dy), and excellent reliability of the dielectric layer may thus be secured even in a case where the thickness of the dielectric layer 111 is 0.53 µm or less.

Therefore, when the thickness of the dielectric layer 111 is 0.53 µm or less, a reliability improving effect of the dielectric layer according to the present disclosure may become more remarkable.

The thickness td of the dielectric layer 111 may refer to an average thickness of the dielectric layer 111 disposed between first and second internal electrodes 121 and 122.

The average thickness of the dielectric layer 111 may be measured from an image obtained by scanning a cross section of the body 110 in the length and thickness directions (L-T) with a scanning electron microscope (SEM).

For example, with respect to any dielectric layer extracted from an image obtained by scanning a cross section of the body 110 in the first and second directions (the length and thickness directions) cut at a central portion of the body 110 in the third direction (the width W direction) with the scanning electron microscope (SEM), thicknesses of the dielectric layer may be measured at thirty points arranged at equal intervals in the length direction to obtain an average value of the measured thicknesses.

The thicknesses of the dielectric layer measured at the thirty points arranged at the equal intervals may be measured in a capacitance forming portion Ac referring to a region in which the first and second internal electrodes 121 and 122 overlap each other.

The body 110 may include the capacitance forming portion Ac disposed in the body 110 and forming capacitance by including the first internal electrodes 121 and the second internal electrodes 122 disposed to face each other with each of the dielectric layers 111 interposed therebetween and cover portions 112 and 113 formed on upper and lower surfaces of the capacitance forming portion Ac in the first direction, respectively.

In addition, the capacitance forming portion Ac, which contributes to forming capacitance of a multilayer ceramic capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be 20 µm or less in order to more easily achieve miniaturization and a capacitance increase of the multilayer electronic component.

In addition, margin portions 114 and 115 may be disposed on side surfaces of the capacity forming portion Ac.

The margin portions 114 and 115 may include a margin portion 114 disposed on the fifth surface 5 of the body 110 and a margin portion 115 disposed on the sixth surface 6. That is, the margin portions 114 and 115 may be disposed on opposite side surfaces of the body 110 in the width direction.

The margin portions 114 and 115 may refer to regions between both distal ends of the first and second internal electrodes 121 and 122 and boundary surfaces of the body 110 in a cross section of the body 110 cut in the width-thickness (W-T) directions, as illustrated in FIG. 3.

The margin portions 114 and 115 may basically serve to prevent damage to the internal electrodes due to physical or chemical stress.

The margin portions 114 and 115 may be formed by applying a conductive paste onto ceramic green sheets except for places where the margin portions are to be formed to form the internal electrodes.

Alternatively, in order to suppress a step due to the internal electrodes 121 and 122, the margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the capacitance forming portion Ac in the width direction.

The internal electrodes 121 and 122 may be stacked alternately with the dielectric layer 111.

The internal electrodes 121 and 122 may include the first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 2, the first internal electrodes 121 may be spaced apart from the fourth surface 4 and be exposed through the third surface 3, and the second internal electrodes 122 may be spaced apart from the third surface 3 and be exposed through the fourth surface 4.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), or alloys thereof on ceramic green sheets. A method of printing the conductive paste for an internal electrode may be a screen printing method, a gravure printing method or the like, but is not limited thereto.

Meanwhile, a thickness to of each of the internal electrodes 121 and 122 does not need to be particularly limited.

However, in general, when the internal electrode is formed to have a small thickness less than 0.6 μm, in particular, when a thickness of the internal electrode is 0.50 μm or less, reliability may be decreased.

As described above, according to an exemplary embodiment in the present disclosure, the reliability such as the insulation resistance may be improved by adjusting the sum (Dy+Tb) of the contents of dysprosium (Dy) and terbium (Tb) and the ratio (Tb/Dy) of the content of terbium (Tb) to the content of dysprosium (Dy) in the dielectric layers, and excellent reliability of the dielectric layer may thus be secured even in a case where the thickness of each of the internal electrodes 121 and 122 is 0.50 μm or less.

Therefore, when the thickness of each of the internal electrodes 121 and 122 is 0.50 μm or less, an effect of the multilayer electronic component according to the present disclosure may become more remarkable, and miniaturization and a capacitance increase of the multilayer electronic component may be more easily achieved.

The thickness to of each of the internal electrodes 121 and 122 may refer to an average thickness of each of the first and second internal electrodes 121 and 122.

The average thickness of each of the internal electrodes 121 and 122 may be measured from an image obtained by scanning a cross section of the body 110 in the length and thickness directions (L-T) with a scanning electron microscope (SEM).

For example, with respect to any internal electrodes 121 and 122 extracted from an image obtained by scanning a cross section of the body 110 in the first and second directions (the length and thickness directions) cut at a central portion of the body 110 in the third direction (the width W direction) with the scanning electron microscope (SEM), a thicknesses of the internal electrode may be measured at thirty points arranged at equal intervals in the length direction to obtain an average value of the measured thicknesses.

The thirty points arranged at the equal intervals may be measured in the capacitance forming portion Ac referring to a region in which the internal electrodes 121 and 122 overlap each other.

The external electrodes 131 and 132 are disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any materials having electrical conductivity, such as a metal, a specific material of each of the external electrodes 131 and 132 may be determined in consideration of electrical characteristics, structural stability and the like, and the external electrodes 131 and 132 may have a multi-layer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be fired electrodes including a conductive metal and glass or resin-based electrodes including a conductive metal or a resin.

Alternatively, the electrode layers 131a and 132a may have a form in which fired electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a fired electrode.

The conductive metal included in the electrode layers 131a and 132a may be a material having excellent electrical connectivity, but is not particularly limited thereto. For example, the conductive metal may be one or more of nickel (Ni), copper (Cu), or alloys thereof.

The plating layers 131b and 132b may serve to improve mounting characteristics of the multilayer electronic component. A type of the plating layers 131b and 132b is not particularly limited. That is, each of the plating layers 131b and 132b may be a plating layer including one or more of Ni, Sn, Pd, or alloys thereof, and may be formed as a plurality of layers.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the capacitance increase of the multilayer electronic component, a reliability improving effect and an insulation resistance improving effect according to the present disclosure in a multilayer electronic component 100 having a size of 1005 (length×width: 1.0 mm×0.5 mm) or less may become more remarkable.

Therefore, considering a manufacturing error, sizes of external electrodes, and the like, when a length of the multilayer electronic component 100 is 1.1 mm or less and a width of the multilayer electronic component 100 is 0.55 mm or less, the reliability improving effect according to the present disclosure may become more remarkable. Here, the length of the multilayer electronic component 100 may refer to a size of the multilayer electronic component 100 in the second direction, and the width of the multilayer electronic component 100 may refer to a size of the multilayer electronic component 100 in the third direction.

Inventive Example

In Inventive Example, a dielectric composition including barium titanate ($BaTiO_3$) as a main component and Dy and Tb in amounts shown in Table 1 based on 100 mol of Ti of the main component was prepared, and prototype multilayer ceramic capacitors (MLCCs) in which dielectric layers were formed using ceramic green sheets including the dielectric composition were then prepared.

For Test Nos. 1 to 4, which are the prototype MLCC samples completed as described above, changes in capacitance of Test Nos. 1 to 4 according to a temperature were measured and shown in Table 2, and temperature coefficients of capacitance (TCCs) of Test Nos. 1 to 4 according to a temperature were shown in Table 3.

An X5R temperature characteristic standard needs to satisfy ±15% of capacitance at 25° C. in the range of −55° C. to 85° C.

TABLE 1

| Test No. | Dy (mol) | Tb (mol) | Dy + Tb (mol) | Tb/Dy |
| --- | --- | --- | --- | --- |
| 1 | 1.4 | 0.1 | 1.5 | 0.07 |
| 2 | 1.5 | 0.2 | 1.7 | 0.13 |
| 3 | 1.8 | 0.2 | 2 | 0.11 |
| 4 | 1.8 | 0.3 | 2.1 | 0.17 |

TABLE 2

| | Capacitance (μF) | | | | | |
| --- | --- | --- | --- | --- | --- | --- |
| Test No. | −55° C. | −25° C. | 5° C. | 25° C. | 55° C. | 85° C. |
| 1 | 3.81 | 4.16 | 4.34 | 4.43 | 4.45 | 3.63 |
| 2 | 3.88 | 4.23 | 4.43 | 4.51 | 4.6 | 3.84 |
| 3 | 3.87 | 4.22 | 4.46 | 4.55 | 4.44 | 3.87 |
| 4 | 3.95 | 4.22 | 4.45 | 4.54 | 4.4 | 3.77 |

TABLE 3

| | TCC (%) | | | | | |
| --- | --- | --- | --- | --- | --- | --- |
| Test No. | −55° C. | −25° C. | 5° C. | 25° C. | 55° C. | 85° C. |
| 1 | −14 | −6 | −2 | 0 | 0.5 | −18 |
| 2 | −14 | −6.3 | −1.9 | 0 | 1.9 | −15 |
| 3 | −15 | −7.1 | −2 | 0 | −2.4 | −15 |
| 4 | −13 | −7 | −2 | 0 | −3 | −17 |

In Test No. 1, the sum (Dy+Tb) of contents of dysprosium (Dy) and terbium (Tb) was 1.5 mol, and a ratio (Tb/Dy) of the content of terbium (Tb) to the content of dysprosium (Dy) was 0.07 mol, and capacitance of Test No. 1 at 85° C. was −18% of capacitance of Test No. 1 at 25° C., such that X5R temperature characteristics were not satisfied.

In Test No. 4, the sum (Dy+Tb) of contents of dysprosium (Dy) and terbium (Tb) was 2.1 mol, and a ratio (Tb/Dy) of the content of terbium (Tb) to the content of dysprosium (Dy) was 0.17 mol, and capacitance of Test No. 1 at 85° C. was −17% of capacitance of Test No. 1 at 25° C., such that X5R temperature characteristics were not satisfied.

On the other hand, it can be seen that in Test Nos. 2 and 3 in which the sum (Dy+Tb) of contents of dysprosium (Dy) and terbium (Tb) is more than 1.5 mol and 2.0 mol or less based on 100 mol of Ti of the main component and 0.1≤Tb/Dy<0.15 in which Tb/Dy is a ratio of the content of terbium (Tb) to the content of dysprosium (Dy), X5R temperature characteristics are satisfied.

As set forth above, according to an exemplary embodiment in the present disclosure, reliability of the dielectric composition and the multilayer electronic component including the same may be improved.

While exemplary embodiments have been shown and described above, it will be apparent to those skilled in the art that modifications and variations could be made without departing from the scope of the present invention as defined by the appended claims.

What is claimed is:

1. A dielectric composition comprising:
a BaTiO$_3$-based main component and a first accessory component,
wherein the first accessory component includes dysprosium (Dy) and terbium (Tb),
a sum (Dy+Tb) of contents of dysprosium (Dy) and terbium (Tb) is more than 1.5 mol and 2.0 mol or less based on 100 mol of Ti of the main component, and
the contents of dysprosium (Dy) and terbium (Tb) satisfies formula of 0.1≤Tb/Dy<0.15 in which Tb/Dy is a molar ratio of the content of terbium (Tb) to the content of dysprosium (Dy).

2. The dielectric composition of claim 1, wherein the content of terbium (Tb) is more than 0.16 mol and less than 0.235 mol based on 100 mol of Ti of the main component.

3. The dielectric composition of claim 1, wherein the first accessory component further includes one or more of Y, Ho, Er, Ce, Nd, Pm, Eu, Tm, Yb, Lu, or Sm.

4. The dielectric composition of claim 1, further comprising a second accessory component including Mg in a content of 0.5 mol or less based on 100 mol of Ti of the main component.

5. The dielectric composition of claim 4, wherein the second accessory component further includes one or more of Al, Cr, Fe, Ni, Co, Cu, Zr, or Hf in an amount of 1.5 mol or less based on 100 mol of Ti of the main component.

6. The dielectric composition of claim 5, wherein a ratio of a sum of contents of the second accessory components to a sum of contents of the first accessory components is more than 1.4 and less than 2.0 in a molar ratio.

7. The dielectric composition of claim 1, further comprising a third accessory component,
wherein the third accessory component includes Mn and V, and
a sum of contents of Mn and V is 0.3 mol or less based on 100 mol of Ti of the main component.

8. The dielectric composition of claim 7, wherein the contents of Mn and V satisfy formula Mn ≥0.2V in a molar ratio.

9. The dielectric composition of claim 1, wherein the sum (Dy+Tb) of the contents of dysprosium (Dy) and terbium (Tb) is more than 1.7 mol based on 100 mol of Ti of the main component.

10. The dielectric composition of claim 1, wherein the contents of dysprosium (Dy) and terbium (Tb) satisfies formula of 0.1≤Tb/Dy<0.13.

11. A multilayer electronic component comprising:
a body including dielectric layers and internal electrodes disposed alternately with the dielectric layers; and
external electrodes disposed on the body,
wherein the dielectric layers include a dielectric composition, and
the dielectric composition includes a BaTiO$_3$ based main component and a first accessory component,
the first accessory component includes dysprosium (Dy) and terbium (Tb),
a sum (Dy+Tb) of contents of dysprosium (Dy) and terbium (Tb) is more than 1.5 mol and 2.0 mol or less based on 100 mol of Ti of the main component, and
the contents of dysprosium (Dy) and terbium (Tb) satisfy formula 0.1≤Tb/Dy<0.15 in which Tb/Dy is a ratio of the molar content of terbium (Tb) to the molar content of dysprosium (Dy).

12. The multilayer electronic component of claim 11, wherein the content of terbium is more than 0.16 mol and less than 0.235 mol based on 100 mol of Ti of the main component.

13. The multilayer electronic component of claim 11, wherein the first accessory component further includes one or more of Y, Ho, Er, Ce, Nd, Pm, Eu, Tm, Yb, Lu, or Sm.

14. The multilayer electronic component of claim 11, wherein the dielectric composition further includes a second accessory component including Mg in an amount of 0.5 mol or less based on 100 mol of Ti of the main component.

15. The multilayer electronic component of claim 14, wherein the second accessory component further includes one or more of Al, Cr, Fe, Ni, Co, Cu, Zr, or Hf, and
a content of the second accessory component is 1.5 mol or less based on 100 mol of Ti of the main component.

16. The multilayer electronic component of claim 15, wherein a ratio of a sum of the contents of the second accessory components to a sum of the contents of the first accessory components is more than 1.4 and less than 2.0 in a molar ratio.

17. The multilayer electronic component of claim 11, wherein the dielectric composition further includes a third accessory component, and
the third accessory component includes Mn and V, and a sum of contents of Mn and V is 0.3 mol or less based on 100 mol of Ti of the main component.

18. The multilayer electronic component of claim 17, wherein the content of Mn and the content of V satisfy formula Mn ≥0.2V in a molar ratio.

19. The multilayer electronic component of claim 11, wherein the sum (Dy+Tb) of the contents of dysprosium (Dy) and terbium (Tb) is more than 1.7 mol based on 100 mol of Ti of the main component.

20. The multilayer electronic component of claim 11, wherein the contents of dysprosium (Dy) and terbium (Tb) satisfies formula of 0.1≤Tb/Dy<0.13.

* * * * *